United States Patent [19]

Bocker et al.

[11] 4,009,380

[45] Feb. 22, 1977

[54] ELECTRO-OPTICAL SYSTEM FOR PERFORMING MATRIX-VECTOR MULTIPLICATION

[75] Inventors: Richard P. Bocker; Keith Bromley, both of San Diego; Michael A. Monahan, Poway; Larry B. Stotts, Chula Vista, all of Calif.

[73] Assignee: The United States of America as represented by the Secretary of the Navy, Washington, D.C.

[22] Filed: Jan. 20, 1975

[21] Appl. No.: 542,524

[52] U.S. Cl. .............................. 235/181; 235/152; 324/77 K; 350/150

[51] Int. Cl.² ..................... G06F 7/56; G06F 15/34

[58] Field of Search ......... 235/181, 152; 324/77 G, 324/77 K; 307/221 CD; 357/24, 30, 31; 179/7.1; 250/211 R, 211 J, 578, 225, 568; 350/150

[56] References Cited

UNITED STATES PATENTS

| | | | |
|---|---|---|---|
| 3,398,269 | 8/1968 | Williams | 235/181 |
| 3,486,016 | 12/1969 | Faiss | 235/181 |
| 3,592,547 | 7/1971 | Noble | 235/181 X |
| 3,652,162 | 3/1972 | Noble | 235/181 X |
| 3,809,873 | 5/1974 | Klahr | 235/181 |
| 3,816,735 | 6/1974 | Bromley | 235/181 |
| 3,856,989 | 12/1974 | Weimer | 178/7.1 |

OTHER PUBLICATIONS

Pike et al., An experimental Solid-State TV Camera RCA-Review, vol. 33, No. 3, Sept. 1972, pp. 483-500.
Kasperkovitz, U.S. Published Patent Application B-334,868, Jan. 28, 1975.

*Primary Examiner*—Jerry Smith
*Attorney, Agent, or Firm*—R. S. Sciascia; G. J. Rubens; J. W. McLaren

[57] ABSTRACT

An electro-optical system for performing matrix-vector multiplication includes a mask having a plurality of elements of substantially equal resolution area disposed in a matrix of M rows and N columns, each element containing recorded discrete information as defined by its degree of opacity which is representative of a predetermined mathematical value in a known matrix. A light source is positioned to illuminate the mask and has its intensity modulated as a function of the sequential values in a N X 1, vector. A multiple photo-responsive array including M elements disposed in a column is positioned to receive the light energy transmitted by the illuminated mask and generates signals at each element commensurate with the instantaneous photo energy received at its position. A suitable means which is synchronously operative with the modulation of the intensity of the light source, sequentially develops cumulative signals corresponding to the signal information contained in each column of the mask, producing a matrix-vector multiplication result.

8 Claims, 7 Drawing Figures

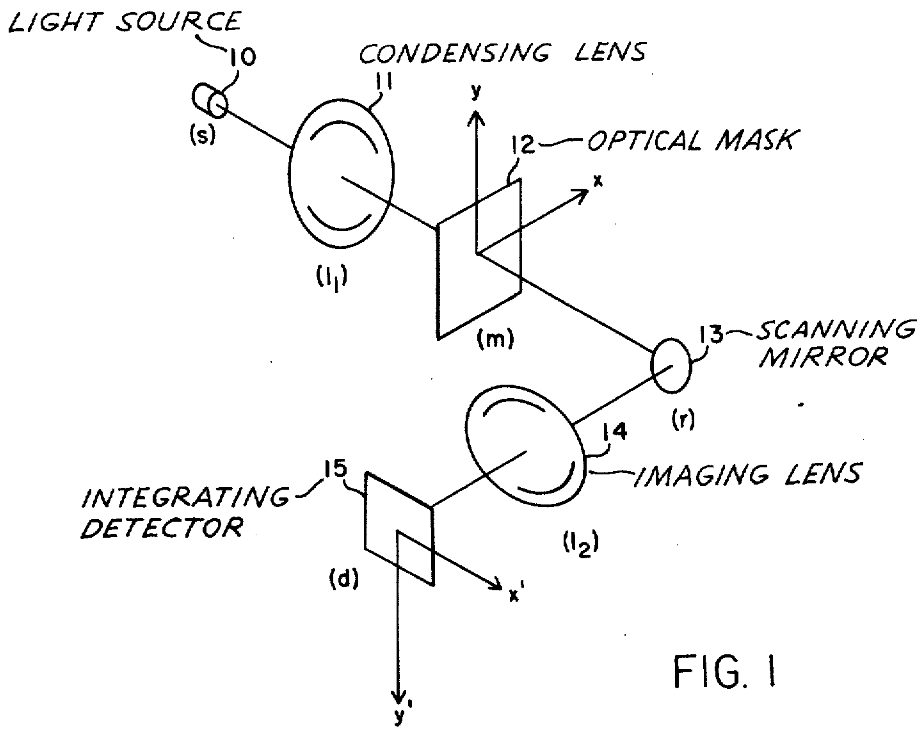
FIG. 1
FIG. 2
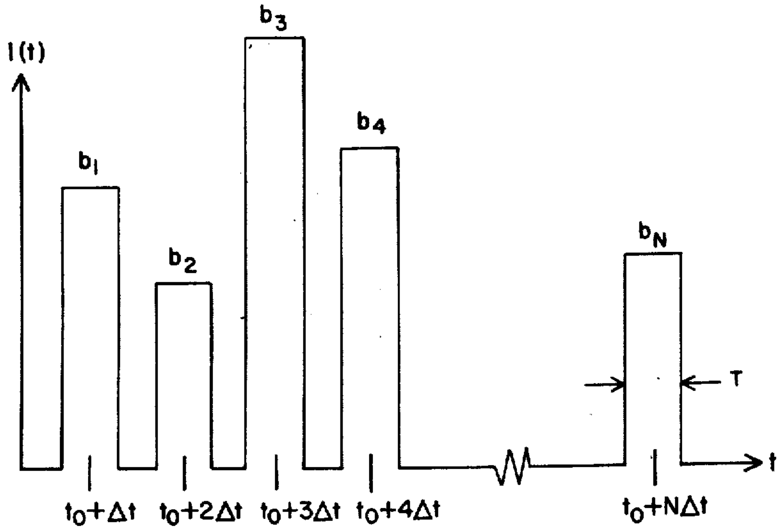

ELECTRO-OPTICAL SYSTEM FOR PERFORMING MATRIX-VECTOR MULTIPLICATION

BACKGROUND OF THE INVENTION

There are many and varied requirements for performing multiplication procedures on extremely complicated and complex mathematical expressions. Such multiplication facilitates studies and analyses such as analysis in the frequency domain, for example, which is often desired.

In many methods of analysis there is a requirement for producing linear transforms, one of the most common examples of which is the requirement for the production of a Fourier transform. In older prior art procedures such linear transforms were produced by laborious mathematical procedures carried out by a series of lengthy, complex, and detailed individual mathematical computations.

More recently, however, the electronic data processing and computation arts have progressed to a point which enables the completion of such mathematical computations by electronic data processing and computation equipments.

The adaptation of optical techniques has many advantages including ease of recording such as on a photographic film, for example, by reason of which degrees of opacity (or conversely degrees of transmittance) are readily made to represent predetermined mathematical values. Moreover, optical techniques facilitate the ready substitution of such recorded information and make use as well of the readily available capabilities of the modern electronic optical arts including those attributes exhibited by light emitting devices, such as light emitting diodes, and the desirable aspects of a light responsive equipment, such as a photo-responsive charge coupled array.

Accordingly, it is desirable that the advantageous aspects of electro optical techniques be availed of to perform mathematical computations such as matrix-vector multiplication to produce linear transforms.

SUMMARY OF THE INVENTION

The present invention comprises an electro-optical system for performing a wide variety of matrix-vector multiplications which may be defined generally by the form $$c_m = \sum_{n=1}^{N} a_{mn} b_n,\ m = 1,2, \ldots M .$$

A mask comprising a plurality of elements is disposed in a matrix of M rows and N columns, where each element may be designated as $a_{mn}$, has a substantially equal resolution area relative to all the other like elements and contains recorded discrete information as defined by its degree of opacity which is representative of a predetermined mathematical value in a known matrix. Such a mask may be conveniently fabricated photographically in a very small, accurate, and convenient form.

A light source is positioned to illuminate the mask and means is arranged for temporally modulating the intensity of the light source as a function of sequential values of $b_n$ in an N X 1 column vector. A multiple photo-responsive array including M elements disposed in a column is positioned to receive the light energy transmitted by the illuminated mask for generating signals at each element commensurate with the instantaneous photo energy received at its position. Such a photo-responsive array may typically include a vidicon tube, for example, or a multiple element photo-responsive charge coupled device. Additionally, means synchronously operated with the modulation of the intensity of the light source sequentially develops cumulative signals corresponding to the signal information contained in each column of the mask. In those embodiments where the photo responsive means is used as a line array such as a vidicon tube or a line array charge coupled device, the described synchronously operative means may comprise an oscillating or rotating reflective element in the form of a mirror, for example.

Alternatively, in a preferred embodiment of the present invention where a photo-responsive area charge coupled device is employed, the multi-element array may be actuated by appropriate clocking pulses synchronously operative with the modulation of intensity of the light source for sequentially developing the cumulative signals corresponding to the signal information contained in each column of the mask, as is desired to produce the linear transform outputs.

STATEMENT OF THE OBJECTS OF THE INVENTION

Accordingly, it is a primary object of the present invention to adapt advanced electro-optical techniques to perform matrix-vector multiplication procedures.

A concomitant primary object of the present invention is to avail of advanced electro-optical techniques for extremely high-speed, reliable, and accurate development of linear transforms such as a Fourier transform, for example.

Another object of the present invention is to facilitate the employment of electro-optical techniques through the use of advanced electro-optical components to perform complex mathematical procedures.

These and other features, objects and advantages of the present invention will be better appreciated from an understanding of the operative principles of a preferred embodiment as described hereinafter and as illustrated in the accompanying drawings.

BRIEF DESCRIPTION OF THE DRAWINGS

In the drawings:

FIG. 1 is a schematic layout diagram of an embodiment of the electro-optical, matrix-vector multiplier system of the present invention;

FIG. 2 is a waveform diagram illustrating typical modulation of the light source employed in the present invention in accordance with column vector values;

DESCRIPTION OF THE PREFERRED EMBODIMENTS

Figure 3A:
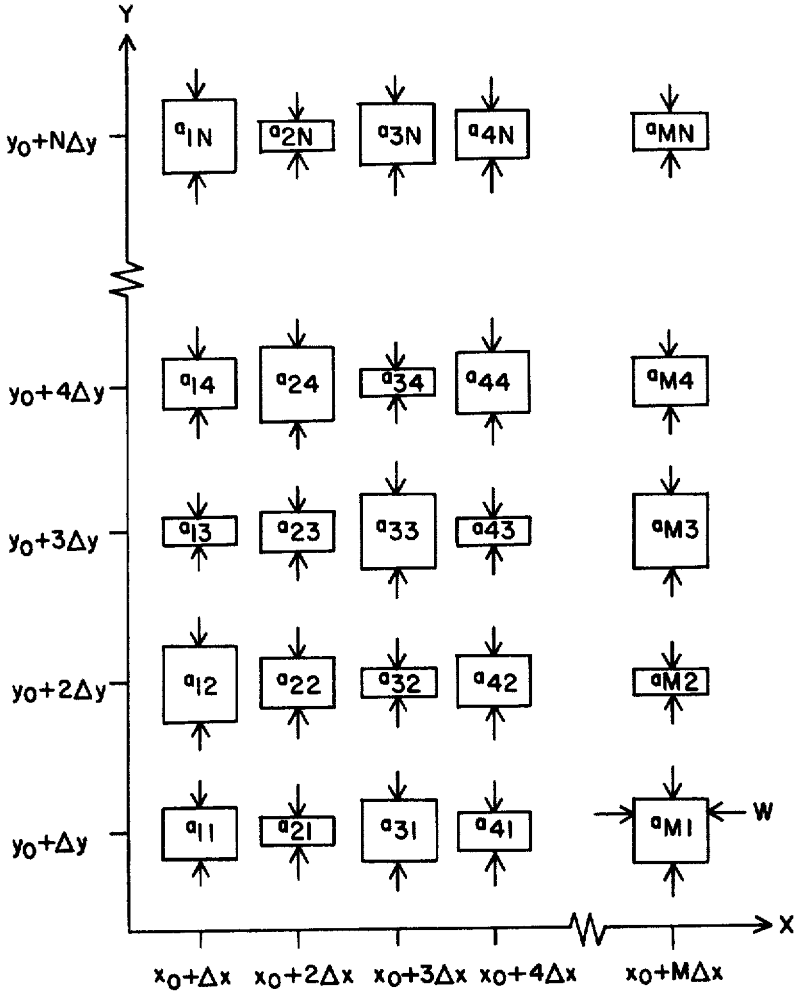
FIGS. 3*a* and 3*b* are schematic illustrations of two types of optical modulation for encoding the recorded matrix information as employed in the present invention.

The concept of the present invention is concerned with the performance of matrix multiplication employing electro-optical techniques and means. The performance of similar matrix multiplication employing coherent sources of light energy together with optical analog methods has previously been reported by R, A. Heinz, J. O. Artman and S. H. Lee in *Applied Optics*, Volume XI, page 174; and also by L. J. Cutrona in the text titled *Optical and Electrical Optical Information Processing*, published by the MIT Press, Cambridge, 1965 and appearing at pages 97 and 98.

The present invention, however, is more specifically concerned with a means and method for performing matrix-vector multiplication procedures in real-time, with the use of an incoherent light source, and with techniques appropriate to the use and processing of such incoherent light energy. The matrix-vector multiplication performed in accordance with the concept and teaching of the present invention may be expressed as $$c_m = \sum_{n=1}^{N} a_{mn} b_n,\ m = 1,2,\ldots M\ . \qquad (1)$$

where the elements $a_{mn}$ constitute a M × N matrix, the elements $b_n$ and $c_m$ represent an N × 1 column vector, and an M × 1 column vector, respectively.

The concept of the present invention employing an incoherent light source and optical techniques is inherently limited to the performance of matrix-vector multiplication operations when the column vector is real-positive, although the matrix may be complex. As a consequence, the concept of the present invention does not extend its usefulness to some versatile applications as a coherent optical processor, but it is nonetheless well suited for many real-time signal processing applications involving a broad variety of discrete linear transformation requirements.

FIG. 1 is a schematic layout diagram of one embodiment of the present invention for performing incoherent electro-optical matrix-vector multiplication functions. The embodiment and system illustrated in FIG. 1 comprises a source of incoherent light energy 10 which is adapted to be responsive to modulated electrical input signals for producing a commensurately modulated light energy output. A condensing lens 11 receives the light energy output of the source 10 for transmission through an optical mask 12. The light energy transmitted through the mask 12 is received by a scanning mirror 13, whence it is transmitted to an imaging lens 14. The imaging lens 14, in turn, transmits the scanned light energy to a photo-responsive integrating detector 15.

A time sequence of electrical pulses containing signal information representative of the N × 1 column vector as illustrated in FIG. 2 is employed to intensity modulate the light source 10. The condensing lens 11 maximizes the light energy throughput in the system by imaging the light emitting from the light source 10 into the entrance pupil of the imaging lens 14.

The mask 12 contains the optically recorded information representative of the mathematical values constituting the M × N matrix. The mask 12 may comprise a photographic optical transparency and, in the system illustrated in FIG. 1, an image of such optical transparency is formed at the detector 15 by the imaging lens 14. The scanning mirror 13 which is interposed in the optical path between the mask 12 and the imaging lens 14 causes the image of the light energy transmitted by the mask 12 to be repetitively translated with a constant velocity across the face of the detector 15. As a result, the output column vector information is generated at the integrating detector 15.

In a typical embodiment of the system illustrated in FIG. 1, the incoherent light source 10 may comprise a commercially available light emitting diode having a peak output of approximately 1 mW centered at approximately 670nm; the mask 12 may comprise a photographic optical transparency generated on a 35 mm slide made from suitable high contrast film; the scanning reflective element 13 in the form of a mirror may be mounted on a galvanometer type movement and driven with a suitable sawtooth electrical waveform to produce repetitive linear translation of the image forming light energy across the face of the detector 15. In a typical embodiment as illustrated in FIG. 1 the imaging lens 14 may take the form of a 50 mm *f*/4 positioned to image the light transmitted through the mask 12 onto the face of the detector 15 in the form of a standard 525 line, closed circuit, television vidicon tube.

Within the concept of the present invention, a fundamental relationship is expressed by the imaging equation which relates to the exposure at the plane of the detector 15 in terms of the irradiance of a light field incident on the mask 12 and the intensity transmittance of the mask 12. By eliminating the effects of certain lens aberrations and diffraction in the interests of simplification and clarification, the exposure may be expressed by the following superposition integral:

$$E(x',y') = (1/m_t^2)\int_{-\infty}^{\infty} I(t)\gamma(x'/m_t, y'/m_t + vt/m_t)dt\ . \qquad (2)$$

In equation (2), $I(t)$ is the irradiance of the incident light field and $\tau(x,y)$ is the intensity transmittance of the mask 12. The quantity $m_t$ represents the transverse magnification between the plane of the mask 12 and the plane of the detector 15. The velocity at which the image of the transparency is scanned across the face of the detector 15 is given by $v$. The function $I(t)$ contains the input vector information and the function $\tau(x,y)$ contains the matrix information. It can be shown that the output vector information is contained in the function $E(x',y')$.

The vector information may be in the form of an electrical time sequence of rectangular pulses as represented by FIG. 2, which electrical signal is employed to intensity modulate the incoherent light source 10. Ideally, the light source 10 and the condensing lens 11 are configured in a manner such that the light energy incident on the mask 12 has a uniform irradiance distribution which varies in time according to the equation:

$$I(t) = \sum_{k=1}^{N} b_k \mathrm{rect}[(t - k\Delta t - t_o)/T] \qquad (3)$$

N represents the total number of light pulses, $b_k$ the height of the $k$th pulse, $\Delta t$ the spacing between adjacent pulse centers, T the pulse duration, and $t_o$ an arbitrary time shift. The rectangle functions appearing in equation (3) above may be expressed as $$\mathrm{rect}(t) \equiv \begin{cases} 1 & |t| < ½ , \\ 0 & |t| > ½ . \end{cases} \quad (4)$$

As was previously mentioned, FIG. 2 depicts a typical signal I($t$) and, as is evident from equation (3), the rectangular pulse heights contain the column vector information. Those skilled and knowledgeable in the art will appreciate that the present optical configuration as illustrated in FIG. 1 constrains the vector elements to take on only real-positive values.

The matrix information may be encoded on a photographic type optical transparency in binary or analog form. For ease of explanation and understanding, the present discussion is limited to the case in which the elements of the matrix are real-positive. However, the more general case of a complex matrix may readily be demonstrated and explained, though it is somewhat more complicated.

The intensity transmittance of the matrix in the form of a photographic optical transparency representing binary encoding may be specified according to the equation:

$$\tau(x,y) = \sum_{n=1}^{N} \sum_{m=1}^{M} \mathrm{rect}(x - m\Delta x - x_o)/W \ \mathrm{rect}(y - n\Delta y - y_o)/a_{mn} \ . \quad (5)$$

Figure 3B:
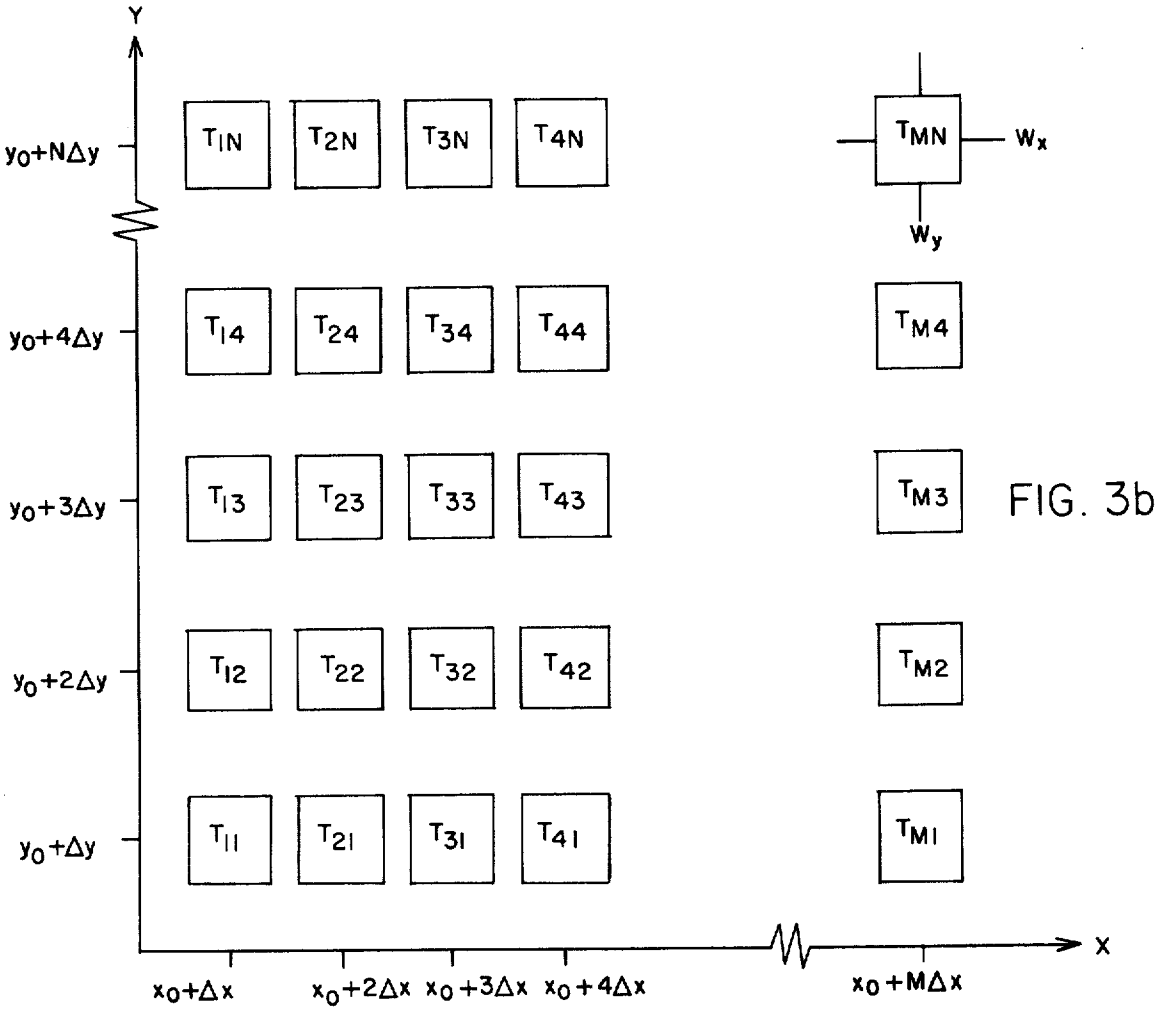

The matrix contains a total number of MN clear rectangular apertures arranged in a rectangular array wherein each element has substantially the same area as is shown schematically in FIG. 3$a$. Accordingly, there is a one-to-one correspondence between each rectangular aperture or element in the array of the matrix in the form of a photographic optical transparency and each element in the mathematical matrix. The linear dimensions of the ($m$ th, $n$th) aperture in the array are given by W and $a_{mn}$ in the $x$ and $y$ directions, respectively. W is the same for all such apertures, whereas $a_{mn}$ is equal to the ($m$th, $n$th) element of the matrix.

The quantities $\Delta x$ and $\Delta y$ correspond to the spacing between apertures centers and $x_0$ and $y_0$ represent arbitrary spatial shifts. The use of binary optical transparencies avoids many of the problems encountered in fabricating continuous tone analog masks; for example, binary masks have previously been employed in both holographic and coherent optical data processing systems as disclosed in publications by B. R. Brown and A. W. Lohmann in Volume V of *Applied Optics*, page 967, A. W. Lohmann and D. P. Paris in Volume VI of *Applied Optics*, page 1739 and A. W. Lohmann and D. P. Paris in volume VII of *Applied Optics*, page 651.

If the mathematical expressions for I($t$) and $\tau(x,y)$ are substituted in equation (2), it can be readily demonstrated that the exposure may be written in the form;

$$E(x',y') = \sum_{m=1}^{M} c_m(y')\mathrm{rect}[(x'/m_t - m\Delta x - x_o)/W] \quad (6)$$

where the quantities $c_m(y')$ are defined by:

$$c_m(y') \equiv \sum_{k=1}^{N} b_k \left\{ (1/vm_t^2) \sum_{n=1}^{N} \int_{-\infty}^{\infty} \mathrm{rect}[(y'' - kv\Delta t - vt_o)/vT] \times \mathrm{rect}[(y''/m_t + y'/m_t - n\Delta y - y_o)/a_{mn}]dy'' \right\}. \quad (7)$$

where the new variable of integration $y''$ is equal to $vt$. It may also be shown that the quantities $c_m(y')$, when evaluated at $y' = 0$, yield a set of coefficients which are linearly proportional to the elements of the output vector defined in equation 1. The result therefore, is $$c_m(0) = (1/vm_t) \sum_{n=1}^{N} a_{mn}b_n \ . \quad (8)$$

The foregoing mathematical expressions and procedures relate to an optical mask of the type illustrated in FIG. 3$a$ where the spatial transmissivity of a portion of each element (i.e. effective size of aperture) varies from element to element in accordance with the values of the mathematical terms represented.

FIG. 3$b$ schematically represents an alternative form of optical mask wherein the optical transmissivity of the entire area of each element varies from element to element in accordance with the values of the mathematical terms represented. Any such discrete area, $T_{mn}$ is equal to $KA_{mn}$, and by using the relationship, $$\tau(x,y) = K \sum_{n=1}^{N} \sum_{m=1}^{M} a_{mn}\mathrm{rect}\,\{(x - m\Delta x - x_o/W_x\} \times \mathrm{rect}\,\{(y - n\Delta y - y_o)/W_y\} \quad (9)$$

and following essentially the same mathematical substitutions and procedures as described hereinbefore, the solution using the alternative type of mask may be obtained.

Figure 4:
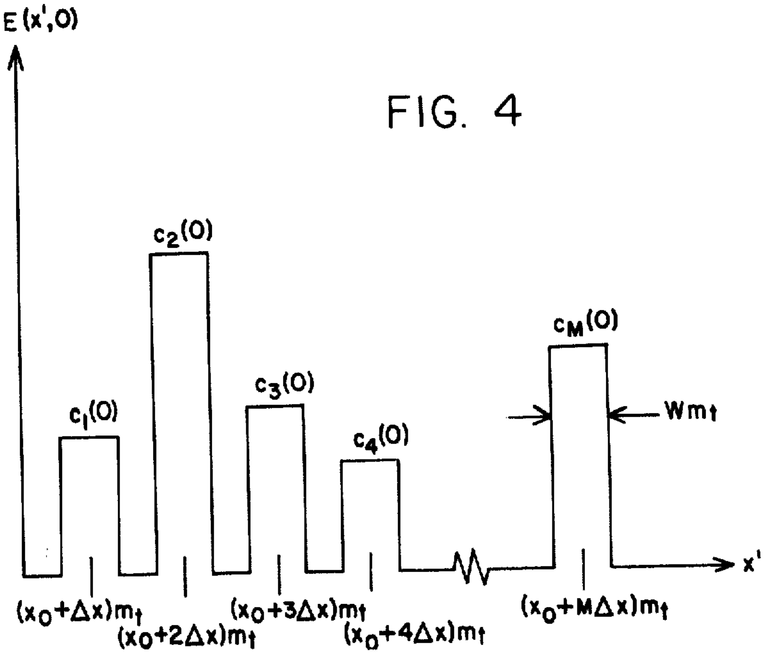
FIG. 4 is a waveform illustration depicting the exposure function $E(x', y')$ for $y' = 0$ containing output column vector information.

Apart from the constant factor ($1/vm_t$), equation (8) is identical to equation (1). Referring to equation (6), it may be seen that the exposure at $y' = 0$ contains the output column vector information in terms of a spatial sequence of rectangular pulses; M represents the total number of pulses, $c_m(0)$ the height of the $m$th pulse, $\Delta xm_t$ the spacing between pulse centers, $Wm_t$ the spatial width of each pulse, and $X_om_t$ an arbitrary spatial shift. FIG. 4 graphically illustrates the exposure for $y' = 0$.

With only relatively minor additions to the previously described encoding techniques, the incoherent electro-optical system and technique for performing matrix-vector multiplication between a real-positive matrix and a real positive vector can be applied equally well to the case in which the matrix is complex. This further technique may be used for encoding the complex matrix information on a photographic optical transparency.

Any arbitrary complex matrix (A) can be decomposed into a linear combination of four real-positive matrices. This may be expressed as $$(A)=(A)_{rp}-(A)_{rn}+j(A)_{ip}-j(A)_{in}, \quad (10)$$

where j is equal to the square root of −1. The matrices $(A)_{rp}$, $(A)_{rn}$, $(A)_{ip}$, and $(A)_{in}$ contain the real-positive, real-negative, imaginary-positive, and imaginary-negative information, respectively, relative to the complex matrix (A).

The information associated with each of these real-positive matrices can be encoded by means of the modulation techniques previously described as recorded on a photographic optical transparency containing four distinct masks arranged side-by-side in a linear array. Each of the four masks in the array is uniquely associated with one of the four real-positive matrices appearing in equation (10). The result is a single optical transparency containing the complex matrix (A) information. By employing this photographic optical transparency in the incoherent optical system of the present invention, four real-positive serial outputs will be produced. The relationship between the four serial outputs, the input of the vector column information and the four real-positive matrices associated with (A) is given by the following set of equations in which the outputs are denoted by $(C)_{rp}$, $(C)_{rn}$, $(C)_{ip}$ and $(C)_{in}$.

$$\begin{aligned}(C)_{rp}&=(A)_{rp}(B),\\ (C)_{rn}&=(A)_{rn}(B),\\ (C)_{ip}&=(A)_{ip}(B),\\ (C)_{in}&=(A)_{in}(B).\end{aligned} \quad (11)$$

The complex vector output (C) can therefore be constructed from these real-positive outputs with the equation, $$(C)=(C)_{rp}-(C)_{rn}+j(C)_{ip}-j(C)_{in}. \quad (12)$$

Figure 5:
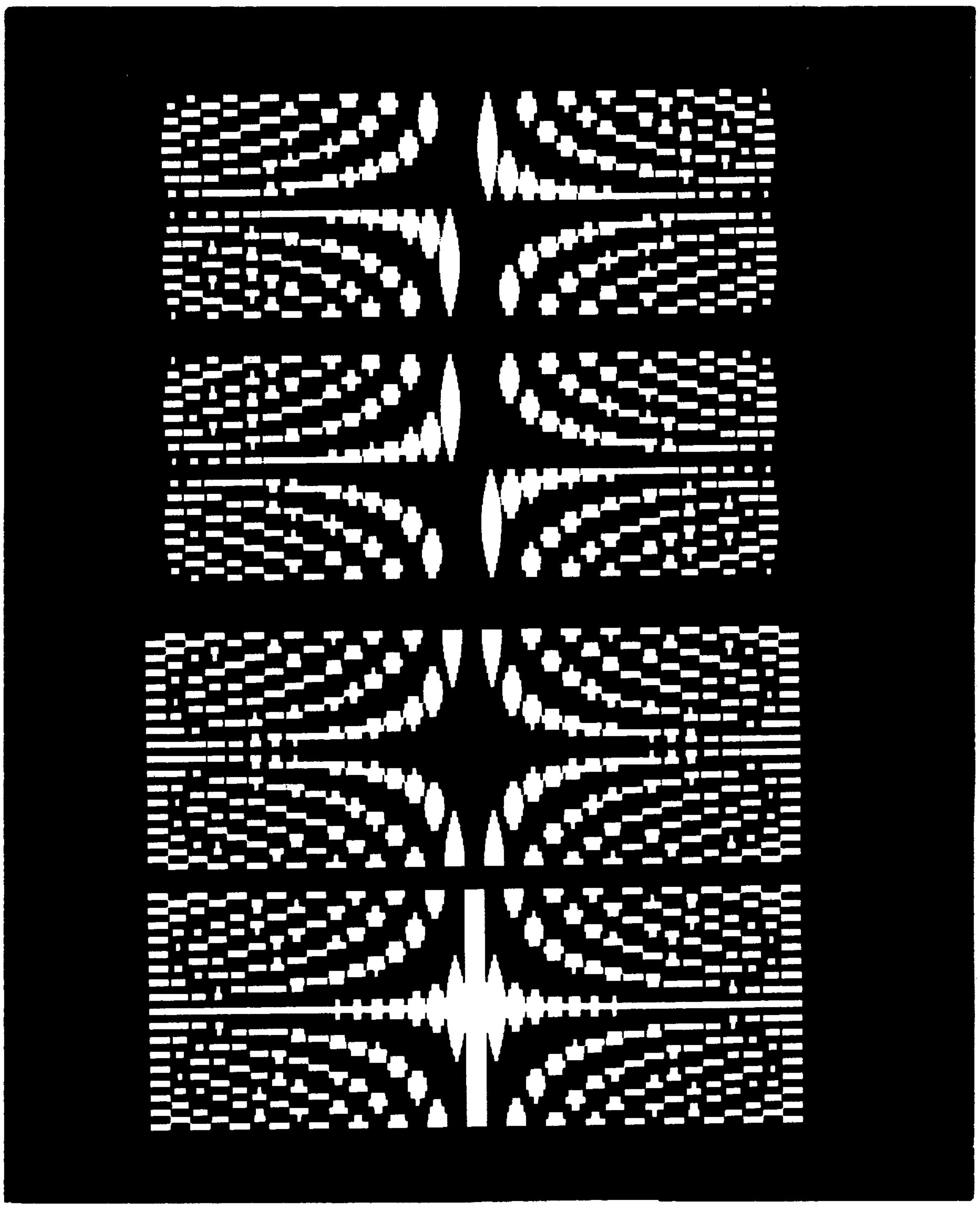
FIG. 5 is an illustration of a typical 35 mm photographic optical transparency which may be employed as the recorded mask matrix used in the present invention to compute a 33 point discrete Fourier transform.

FIG. 5 illustrates a mask employed in accordance with the concept and teaching of the present invention which is fabricated from a photographic optical transparency used to compute a 33 point discrete Fourier transform, the general type of which was described immediately herein before.

Figure 6:
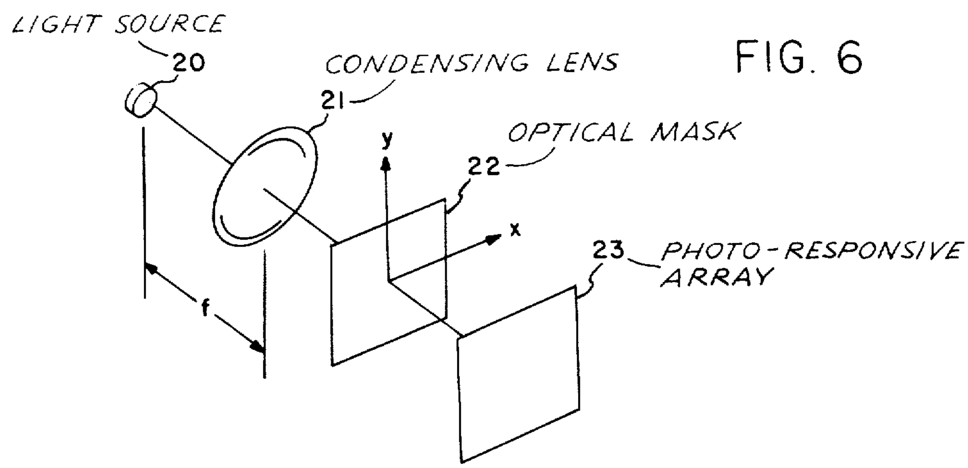
FIG. 6 is a schematic layout diagram illustrating an alternate embodiment of the present invention, including a photo-responsive charge coupled device array.

FIG. 6 illustrates a variant preferred embodiment of the present invention, including a modulatable incoherent source of light energy 20, an appropriate condensing lens 21, and a mask 22 having a plurality of elements disposed in a matrix of M rows and N columns wherein each element has a substantially equal resolution area and contains recorded discrete information as defined by its degree of opacity representative of a predetermined mathematical value in a known matrix.

In the embodiment illustrated in FIG. 6, a charge coupled device comprising a photo-responsive multi-element array 23 is employed in place of the articulated reflective sweep means employed in the embodiment illustrated in FIG. 1, the imaging lens, and also the integrating detector of FIG. 1. The photo-responsive discrete areas of the charge coupled device 23 may take the form of a multi-element, self-scanning image sensor as typified by the presently available Fairchild CCD201which had 10,000 such elements disposed in a 100 × 100 format. In the operation of such self-scanning image sensors of the charge coupled device type, information is readily available from such manufacturers as Fairchild as to the required clocking pulses and associated peripheral circuitry necessary for their proper operation. The illustration of FIG. 6 is spatially expanded for purposes of illustration and understanding. Preferably the mask 22 would directly overlay the charge coupled device array 23 in the operative arrangement.

It will be evident to those skilled and knowledgeable in the pertinent arts that the present invention conceives and teaches the advantageous use of incoherent electro-optical analog methods and means for performing matrix-vector multiplication.

The teachings and techniques of the present invention for encoding matrix information on a two-dimensional optical photographic transparency mask by means of optical modulation avail of the desirable aspects of (1) permanancy of recording, (2 ) use of advanced readily available microphotographic techniques, (3) and a highly desirable degree of reliability and accuracy.

Two principal techniques for encoding information on the mask as a function of optical opacity are: (1) spatial transmissivity of a portion of each element which varies from element to element commensurate with the mathematical values represented, or (2) optical transmissivity of the entire area within each element which varies from element to element commensurate with the mathematical values represented.

In (1) the elements are binarily represented in the sense that a discrete portion of each element is completely opaque while the remainder is virtually wholly transparent; in (2 ) the values are represented by the degree of greyness of the entire area of each element.

Discrete finite Fourier transforms have been performed experimentally to demonstrate the feasibility and desirability of matrix vector multiplication as conceived by the present invention. Matrix and vector array sizes employed were 33 × 33 and 33 × 1 formats, respectively, and the average value of correlation coefficients between theoretically derived and experimental data was found to be 0.95, demonstrating an extremely high degree of accuracy and reliability in the practice of the present invention.

Obviously many modifications and variations of the present invention are possible in the light of the above teachings. It is therefore to be understood that within the scope of the appended claims the invention may be practiced otherwise than as specifically described.

What is claimed is:

1. An electro-optical system for performing matrix-vector multiplication of the form $$cm = \sum_{n=1}^{N} a_{mn}\, b_n \quad m = 1,2, \ldots M$$

comprising:

a mask of a plurality of elements disposed in a matrix of M rows and N columns, each such element $a_{mn}$ having a substantially equal resolution area relative to all other like elements and containing recorded discrete information as defined by its degree of opacity representative of a predetermined mathematical value in a known matrix;

a light source positioned to illuminate said mask, said light source being responsive to input signals for temporally modulating the intensity of said light source as a function of the sequential values of $b_n$ in a N × 1 column vector;

a multiple photo-responsive array including M elements disposed in a column and positioned to receive the light energy transmitted by the illuminated mask for generating signals at each element commensurate with the instantaneous photo energy received at its position; and means synchronously responsive to said input signals and the modulation of the intensity of said light source for sequentially developing cumulative signals corresponding to the signal information contained in each column of said mask.

2. An electro-optical system for performing matrix-vector multiplication as claimed in claim 1 wherein said light source generates incoherent light energy.

3. An electro-optical system for performing matrix-vector multiplication as claimed in claim 1 wherein said light source is a light emitting diode.

4. An electro-optical system for performing matrix-vector multiplication as claimed in claim 1 wherein said multiple photo-responsive elements comprise a vidicon tube.

5. An electro-optical system for performing matrix-vector multiplication as claimed in claim 4 wherein said means synchronously responsive to said input signals and the modulation of the intensity of said light source for sequentially developing cumulative signals corresponding to the signal information contained in each column of said matrix mask comprises a reflective means repetitively driven for sweeping the light energy transmitted by said mask.

6. An electro-optical system for performing matrix-vector multiplication as claimed in claim 1 wherein said multiple photo-responsive elements comprise a line array photo-responsive detector.

7. An electro-optical system for performing matrix-vector multiplication as claimed in claim 1 wherein said multiple photo-responsive elements comprises a photo-responsive charge-coupled device disposed in a multiple element array.

8. An electro-optical system for performing matrix-vector multiplication as claimed in claim 1 wherein said mask comprises a photographically recorded mask.

* * * * *